(12) United States Patent
Suzuki (10) Patent No.: US 8,884,543 B2
(45) Date of Patent: Nov. 11, 2014

(54) LIGHT SOURCE DEVICE, PROJECTOR, AND METHOD OF DRIVING DISCHARGE LAMP

(71) Applicant: Seiko Epson Corporation, Tokyo (JP)

(72) Inventor: Junichi Suzuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 13/752,680

(22) Filed: Jan. 29, 2013

(65) Prior Publication Data

US 2013/0207568 A1 Aug. 15, 2013

(30) Foreign Application Priority Data

Feb. 10, 2012 (JP) ................................. 2012-027825

(51) Int. Cl.
| | |
|---|---|
| H05B 41/16 | (2006.01) |
| H05B 41/24 | (2006.01) |
| H05B 37/00 | (2006.01) |
| H05B 39/00 | (2006.01) |
| H05B 41/36 | (2006.01) |
| H05B 41/288 | (2006.01) |
| H05B 41/292 | (2006.01) |
| H05B 41/28 | (2006.01) |

(52) U.S. Cl.
CPC ............ *H05B 41/36* (2013.01); *H05B 41/2928* (2013.01); *H05B 41/28* (2013.01); *H05B 41/2887* (2013.01); *Y02B 20/202* (2013.01)
USPC .......................................... 315/287; 315/246

(58) Field of Classification Search
CPC .. H05B 41/2928; H05B 41/392; H05B 41/28; H05B 41/34; B23K 11/248; Y02B 20/28; H01J 65/046
USPC .................... 315/287, 209, 246, 72, 172, 174
See application file for complete search history.

(56) References Cited

U.S. PATENT DOCUMENTS

| | | | |
|---|---|---|---|
| 5,804,924 A | 9/1998 | Ohnishi et al. | |
| 7,999,488 B2 * | 8/2011 | Okawa | 315/291 |
| 8,164,266 B2 | 4/2012 | Okamoto et al. | |
| 8,541,954 B2 * | 9/2013 | Saka et al. | 315/246 |
| 8,742,697 B2 * | 6/2014 | Suzuki et al. | 315/308 |
| 2009/0001904 A1 * | 1/2009 | Okawa | 315/291 |
| 2010/0084987 A1 | 4/2010 | Yamauchi et al. | |

(Continued)

FOREIGN PATENT DOCUMENTS

| | | |
|---|---|---|
| JP | A-5-266984 | 10/1993 |
| JP | A-7-282986 | 10/1995 |

(Continued)

*Primary Examiner* — Dylan White
(74) *Attorney, Agent, or Firm* — Oliff PLC (57) ABSTRACT

A light source device includes a discharge lamp having a light emitting case and a pair of electrodes, a drive device, a voltage detector, and a time measurement device, the drive device alternately repeats a first alternating current supply interval and a second alternating current supply interval, measures a period of the first and the second alternating current supply interval with the time measurement device, performs a change from the first alternating current supply interval to the second alternating current supply interval when the period of the first alternating current supply interval reaches a predetermined period A, and performs a change from the second alternating current supply interval to the first alternating current supply interval when the period of the second alternating current supply interval reaches a predetermined period B, or when an absolute value of an inter-electrode voltage of the pair of electrodes reaches a threshold value.

15 Claims, 7 Drawing Sheets

(56) References Cited

U.S. PATENT DOCUMENTS

| | | | |
|---|---|---|---|
| 2010/0148686 A1* | 6/2010 | Arimoto et al. | 315/246 |
| 2011/0025989 A1* | 2/2011 | Ono et al. | 353/85 |
| 2011/0221356 A1* | 9/2011 | Saka et al. | 315/246 |
| 2013/0050661 A1* | 2/2013 | Suzuki et al. | 353/85 |
| 2013/0050662 A1* | 2/2013 | Suzuki et al. | 353/85 |
| 2013/0083300 A1* | 4/2013 | Sato et al. | 353/85 |
| 2013/0207568 A1* | 8/2013 | Suzuki | 315/287 |
| 2014/0063471 A1* | 3/2014 | Suzuki et al. | 353/85 |

FOREIGN PATENT DOCUMENTS

| | | |
|---|---|---|
| JP | A-9-97694 | 4/1997 |
| JP | A-10-162977 | 6/1998 |
| JP | A-2007-115534 | 5/2007 |
| JP | A-2010-114064 | 5/2010 |
| JP | A-2010-123478 | 6/2010 |

* cited by examiner

LIGHT SOURCE DEVICE, PROJECTOR, AND METHOD OF DRIVING DISCHARGE LAMP

BACKGROUND

1. Technical Field

The present invention relates to a light source device, a projector, and a method of driving a discharge lamp.

2. Related Art

As a light source of a projector, there is used a discharge lamp such as a high-pressure mercury lamp or a metal halide lamp.

Such a discharge lamp is driven with a drive method of, for example, supplying a high-frequency alternating current as a drive current (see, e.g., JP-A-2007-115534 (Document 1)). According to this drive method, stability of discharge can be obtained, blackening and devitrification of the discharge lamp main body can be prevented, and the degradation of the lifetime of the discharge lamp can be suppressed.

However, in this drive method, the arc discharge occurs between a pair of electrodes while the discharge lamp is in the lighting state, and the electrodes are heated to a high temperature, and therefore, the electrodes are melted, and the distance between the electrodes grows.

In the usage of, for example, a projector, it is preferable for improving the efficiency of the light to keep the state in which the distance between the electrodes is short to thereby reduce the size of the light emission. The growing of the distance between the electrodes during lighting leads to the degradation of the efficiency of the light, which is not preferable.

On the other hand, there also exists a drive method of supplying an alternating current (an alternating direct current) having a low frequency and a rectangular waveform as the drive current (see, e.g., JP-A-2010-114064 (Document 2)). According to this drive method, a projection is provided to each of the tip portions of a pair of electrodes while the discharge lamp is in the lighting state, and thus the state in which the distance between the electrodes is short can be kept.

However, in this drive method, there arises a problem that there occur the blackening, the devitrification, and so on of the discharge lamp main body to thereby reduce the lifetime of the discharge lamp.

Further, JP-A-2010-123478 (Document 3) discloses a lighting device of alternately supplying a pair of electrodes with an alternating current having a steady lighting frequency in a range of 60 through 1000 Hz and an alternating current having a lower frequency in a range of 5 through 200 Hz, which is lower than the steady lighting frequency, to thereby light the discharge lamp.

However, in the lighting device described in Document 3, since both of the alternating current with the steady lighting frequency and the alternating current with the lower frequency have too low frequencies, there arises a problem that there occur the blackening, the devitrification, and so on of the discharge lamp main body to thereby reduce the lifetime of the discharge lamp. Further, although the projection is provided to each of the tip portions of the pair of electrodes while the discharge lamp is in the lighting state, the electrodes are gradually consumed while the discharge lamp is lit for a long period of time such as several hundreds or several thousands of hours, and it becomes unachievable to grow the projections to a predetermined size.

SUMMARY

An advantage of the invention is to provide a light source device, a projector, and a method of driving a discharge lamp while suppressing the blackening of the discharge lamp, and keeping the inter-electrode distance within a allowable distance range.

An aspect of the invention is directed to a light source device including a discharge lamp having a light emitting case including a hollow section in which a discharge medium is encapsulated, and a pair of electrodes having respective end portions disposed so as to be opposed to each other in the hollow section, a drive device adapted to supply the pair of electrodes with a drive current, a voltage detector adapted to detect an inter-electrode voltage of the pair of electrodes, and a time measurement device adapted to measure time, the drive device is configured to alternately repeat a first alternating current supply interval in which the pair of electrodes are supplied with a first alternating current with a frequency higher than 1 kHz and a second alternating current supply interval in which the pair of electrodes are supplied with a second alternating current with a frequency one of equal to and lower than 1 kHz, a period of the first alternating current supply interval is measured with the time measurement device, the drive device performs a change from the first alternating current supply interval to the second alternating current supply interval when the period of the first alternating current supply interval measured reaches a predetermined period A, a period of the second alternating current supply interval is measured with the time measurement device, and the drive device performs a change from the second alternating current supply interval to the first alternating current supply interval one of when the period of the second alternating current supply interval measured reaches a predetermined period B, and when an absolute value of the inter-electrode voltage of the pair of electrodes reaches a threshold value.

Thus, it is possible to suppress the blackening of the discharge lamp in the first alternating current supply interval, and further, make the discharge lamp, which is blackened in the second alternating current supply interval, recover from the blackening.

On the other hand, in the second alternating current supply interval, the projections are provided to the tip portions of the pair of electrodes, and then grow to thereby make it possible to reduce the inter-electrode distance of the pair of electrodes, which has been increased in the first alternating current supply interval.

By alternately repeating such first alternating current supply interval and second alternating current supply interval, it is possible to drive the discharge lamp while suppressing the blackening of the discharge lamp, and keeping the inter-electrode distance of the pair of electrodes within the allowable distance range.

Further, in particular, in the initial stage of the lighting of the discharge lamp in which the discharge lamp is difficult to recover from the blackening, it is possible to make the discharge lamp recover from the blackening in the first alternating current supply interval.

In the light source device according to the above aspect of the invention, it is preferable that the threshold value is an absolute value of the inter-electrode voltage of the pair of electrodes when a power supplied to the pair of electrodes reaches a rated wattage after lighting the discharge lamp.

Thus, it is possible to more surely suppress the blackening of the discharge lamp, and keep the inter-electrode distance of the pair of electrodes within the allowable distance range.

In the light source device according to the above aspect of the invention, it is preferable that a ratio A/B between the period A and the period B is no lower than 0.5 and no higher than 10.

Thus, it is possible to more surely suppress the blackening of the discharge lamp, and keep the inter-electrode distance of the pair of electrodes within the allowable distance range.

In the light source device according to the above aspect of the invention, it is preferable that the period A is longer than the period B.

Thus, it is possible to more surely make the discharge lamp recover from the blackening in the first alternating current supply interval.

In the light source device according to the above aspect of the invention, it is preferable that the period A is no shorter than 1 minute and no longer than 60 minutes.

Thus, it is possible to more surely make the discharge lamp recover from the blackening in the first alternating current supply interval.

In the light source device according to the above aspect of the invention, it is preferable that the period B is no shorter than 1 minute and no longer than 60 minutes.

Thus, the inter-electrode distance of the pair of electrodes can more surely be kept within the allowable distance range.

In the light source device according to the above aspect of the invention, it is preferable that in the first alternating current supply interval, an amplitude of the first alternating current is decreased with time.

Thus, the variation in light intensity can be suppressed.

In the light source device according to the above aspect of the invention, it is preferable that in the second alternating current supply interval, an amplitude of the second alternating current is increased with time.

Thus, the variation in light intensity can be suppressed.

In the light source device according to the above aspect of the invention, it is preferable that a waveform of the first alternating current has a rectangular shape.

Thus, the blackening of the discharge lamp can more surely be suppressed.

In the light source device according to the above aspect of the invention, it is preferable that a waveform of the second alternating current has a rectangular shape.

Thus, the blackening of the discharge lamp can more surely be suppressed.

In the light source device according to the above aspect of the invention, it is preferable that the first alternating current is supplied to thereby suppress blackening of the discharge lamp.

Thus, the blackening of the discharge lamp can be suppressed.

In the light source device according to the above aspect of the invention, it is preferable that the second alternating current is supplied to thereby decrease an inter-electrode distance of the pair of electrodes.

Thus, the inter-electrode distance of the pair of electrode, which has been increased in the first alternating current supply interval, can be decreased, and then the inter-electrode distance can be kept at a constant distance.

In the light source device according to the above aspect of the invention, it is preferable that an average value of an amplitude of the first alternating current in the first alternating current supply interval and an average value of an amplitude of the second alternating current in the second alternating current supply interval are equal to each other.

Thus, it is possible to make the light intensity in the first alternating current supply interval and the light intensity in the second alternating current supply interval equal to each other.

Another aspect of the invention is directed to a method of driving a discharge lamp having a light emitting case including a hollow section in which a discharge medium is encapsulated, and a pair of electrodes having respective end portions disposed so as to be opposed to each other in the hollow section. The method includes generating a drive current having a first alternating current supply interval in which the pair of electrodes are supplied with a first alternating current with a frequency higher than 1 kHz and a second alternating current supply interval in which the pair of electrodes are supplied with a second alternating current with a frequency one of equal to and lower than 1 kHz repeated alternately, changed from the first alternating current supply interval to the second alternating current supply interval when a period of the first alternating current supply interval reaches a predetermined period A, and changed from the second alternating current supply interval to the first alternating current supply interval one of when a period of the second alternating current supply interval reaches a predetermined period B, and when an absolute value of an inter-electrode voltage of the pair of electrodes reaches a threshold value, and supplying the pair of electrodes with the drive current.

Thus, it is possible to suppress the blackening of the discharge lamp, and drive the discharge lamp while keeping the inter-electrode distance of the pair of electrodes within the allowable distance range.

Further, in particular, in the initial stage of the lighting of the discharge lamp in which the discharge lamp is difficult to recover from the blackening, it is possible to make the discharge lamp recover from the blackening in the first alternating current supply interval.

Still another aspect of the invention is directed to a projector including a light source device adapted to emit light, a modulation device adapted to modulate the light emitted from the light source device in accordance with image information, and a projection device adapted to project the light modulated by the modulation device, the light source device includes a discharge lamp having a light emitting case including a hollow section in which a discharge medium is encapsulated, and a pair of electrodes having respective end portions disposed so as to be opposed to each other in the hollow section, a drive device adapted to supply the pair of electrodes with a drive current, a voltage detector adapted to detect an inter-electrode voltage of the pair of electrodes, and a time measurement device adapted to measure time, the drive device is configured to alternately repeat a first alternating current supply interval in which the pair of electrodes are supplied with a first alternating current with a frequency higher than 1 kHz and a second alternating current supply interval in which the pair of electrodes are supplied with a second alternating current with a frequency one of equal to and lower than 1 kHz, a period of the first alternating current supply interval is measured with the time measurement device, the drive device performs a change from the first alternating current supply interval to the second alternating current supply interval when the period of the first alternating current supply interval reaches a predetermined period A, a period of the second alternating current supply interval is measured with the time measurement device, and the drive device performs a change from the second alternating current supply interval to the first alternating current supply interval one of when the period of the second alternating current supply interval reaches a predetermined period B, and when an absolute value of the inter-electrode voltage of the pair of electrodes reaches a threshold value.

Thus, it is possible to suppress the blackening of the discharge lamp, and drive the discharge lamp while keeping the inter-electrode distance of the pair of electrodes within the allowable distance range. Therefore, the power consumption can be reduced, and further, a stable and preferable image can be displayed.

Further, in particular, in the initial stage of the lighting of the discharge lamp in which the discharge lamp is difficult to recover from the blackening, it is possible to make the discharge lamp recover from the blackening in the first alternating current supply interval.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a light source device, a projector, and a method of driving a discharge lamp according to the invention will be explained in detail based on an exemplary embodiment shown in the accompanying drawings.

Light Source Device

Figure 1:
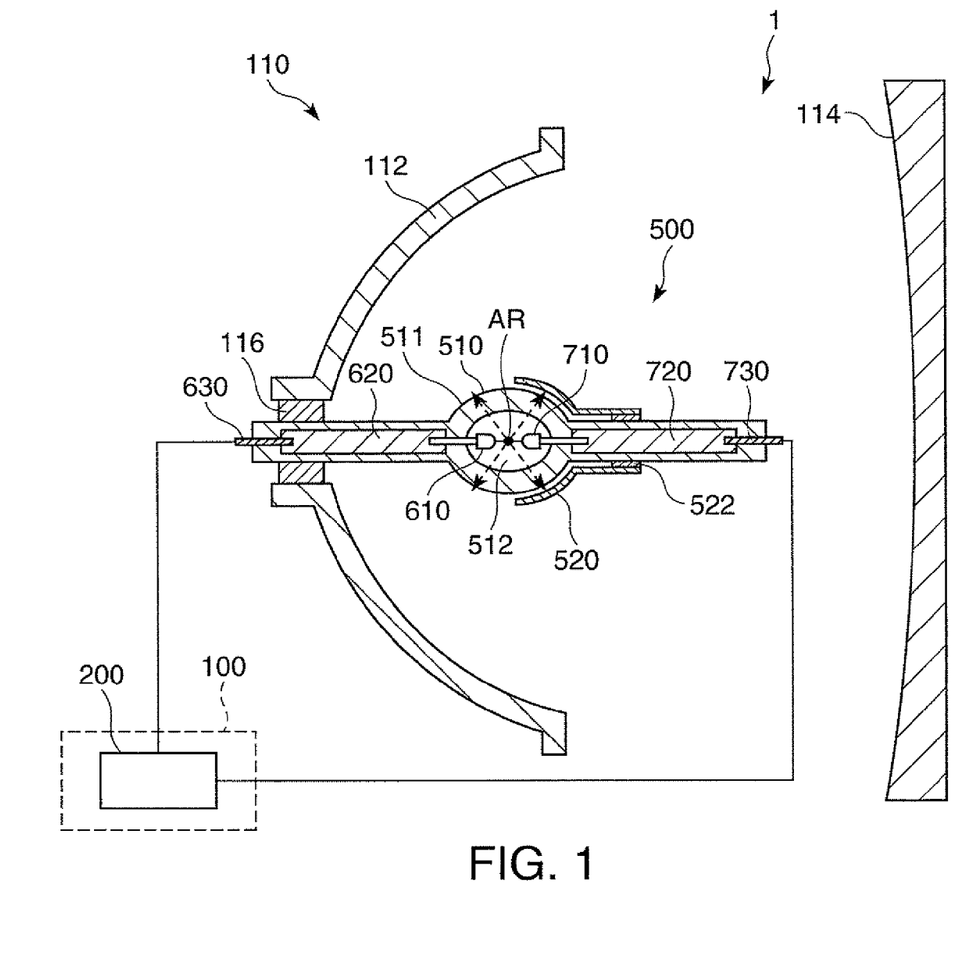
FIG. 1 is a cross-sectional view (including a block diagram) showing a light source device as an embodiment of the invention.
Figure 2:
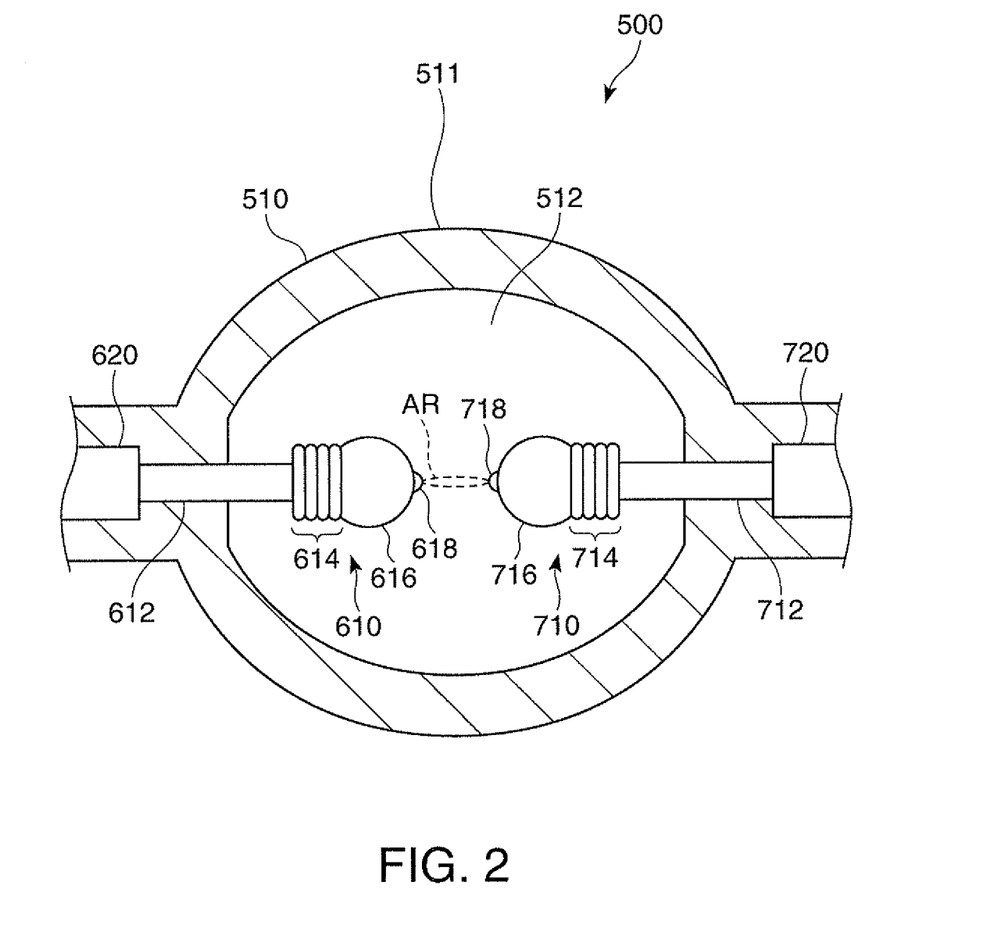
FIG. 2 is a cross-sectional view showing a discharge lamp of the light source device shown in FIG. 1.
Figure 3:
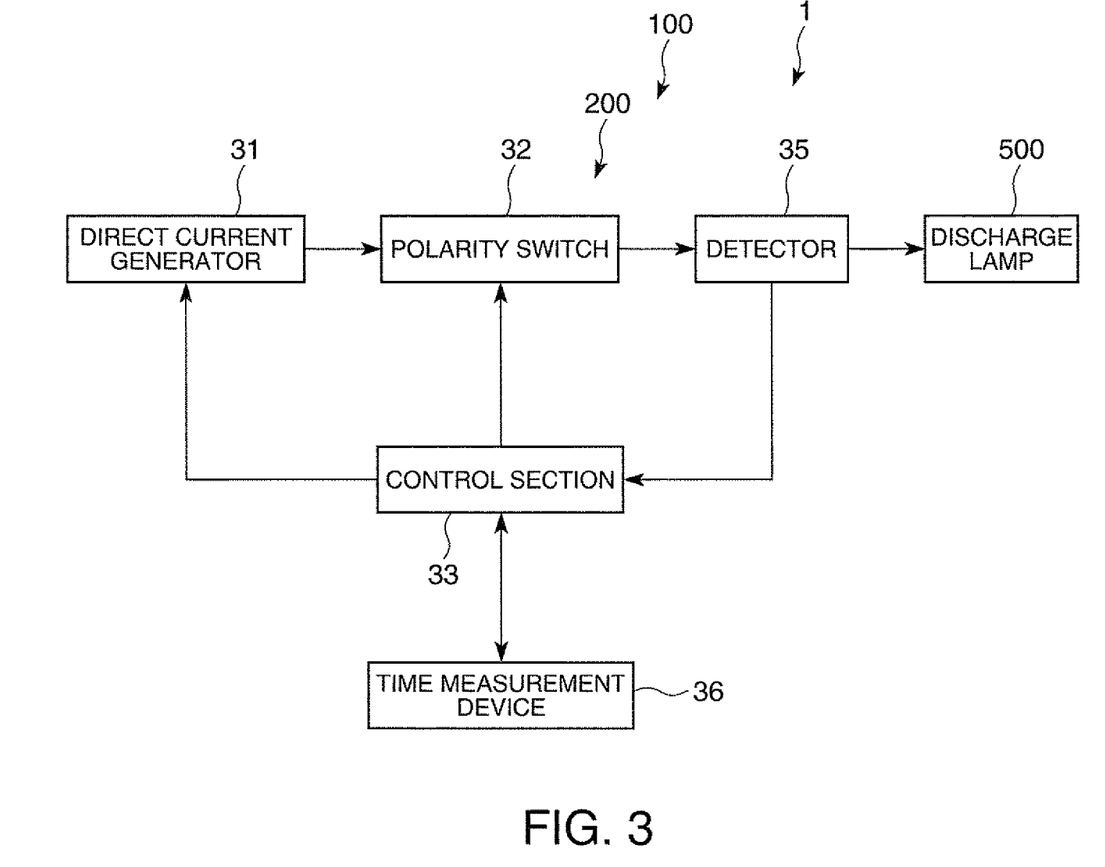
FIG. 3 is a block diagram showing the light source device shown in FIG. 1.
Figure 4:
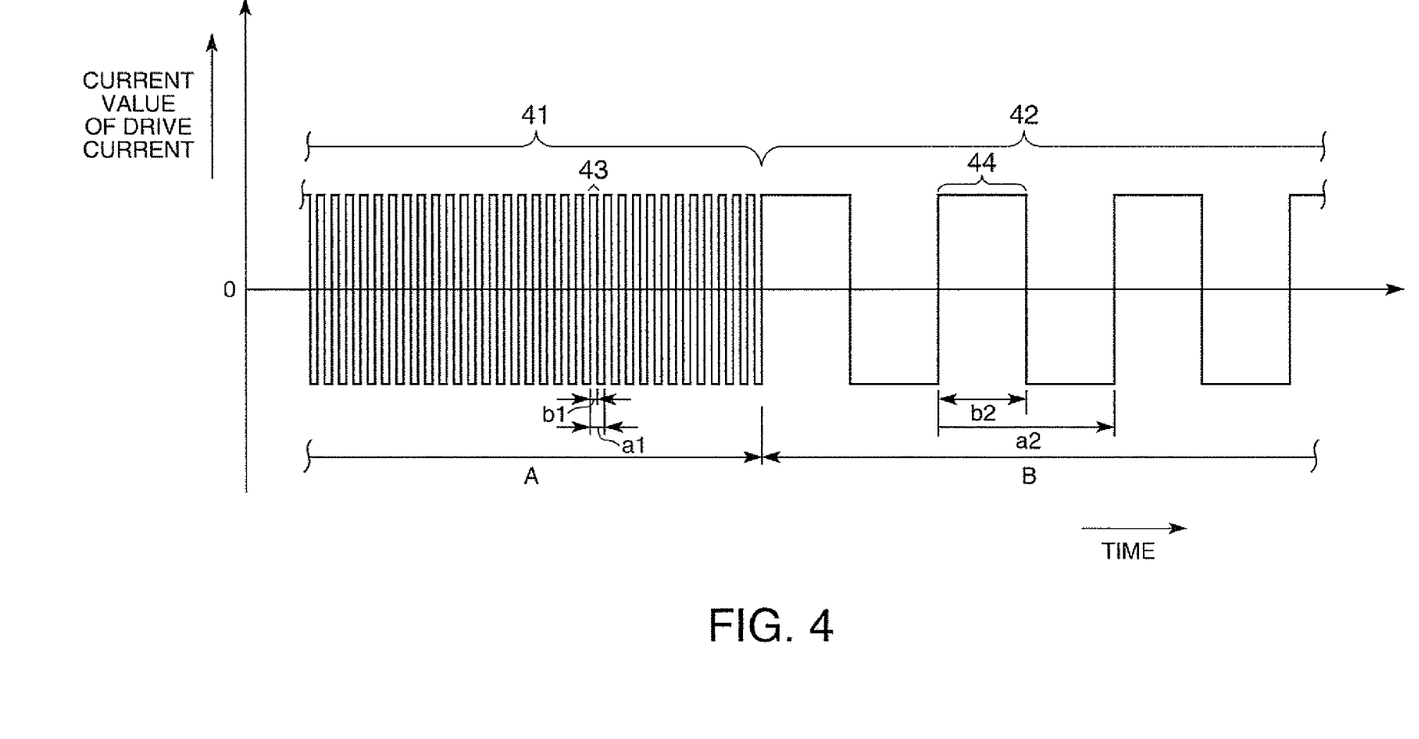
FIG. 4 is a diagram showing a drive current of the light source device shown in FIG. 1.
Figure 5:
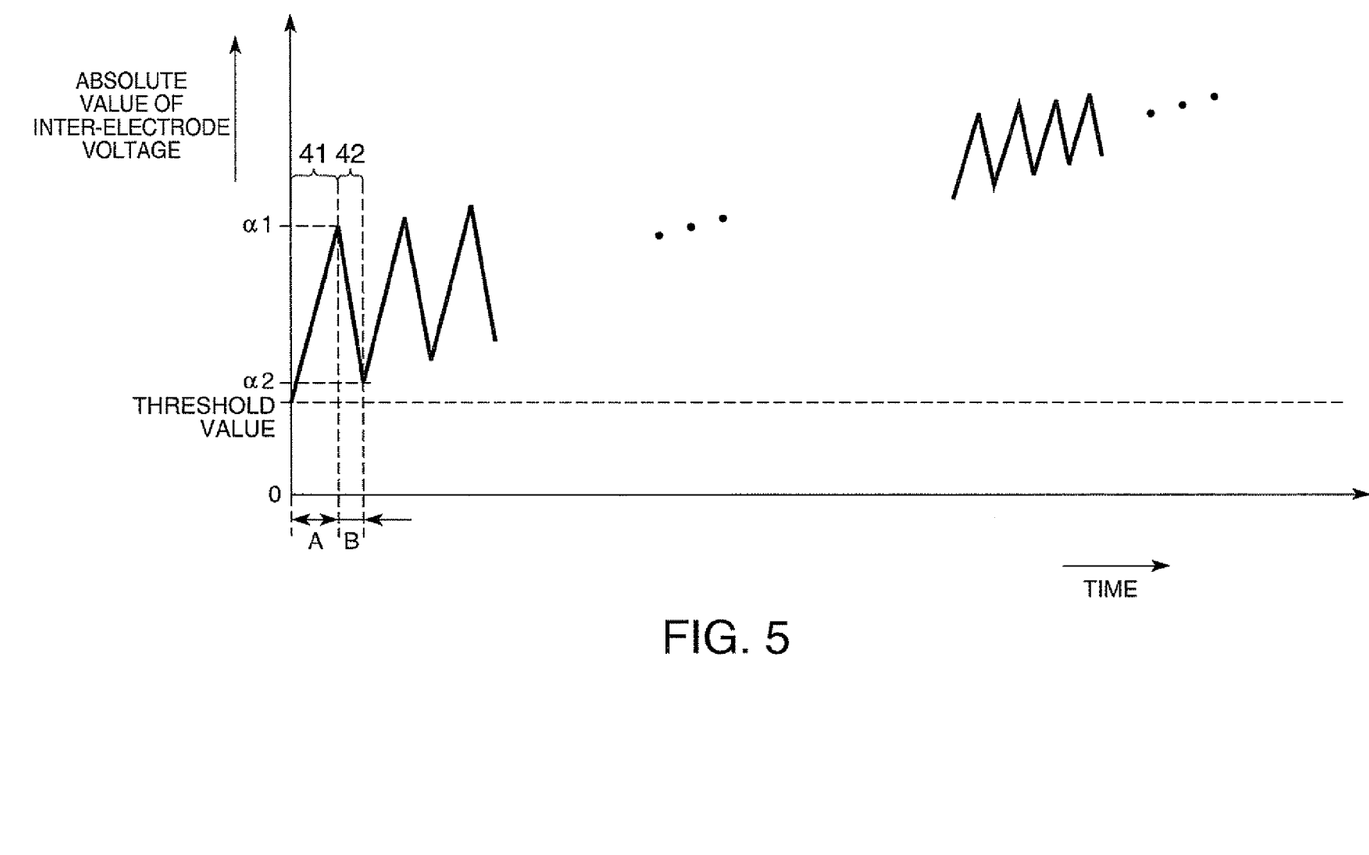
FIG. 5 is a diagram showing an absolute value of the inter-electrode voltage of the light source device shown in FIG. 1.
Figure 6:
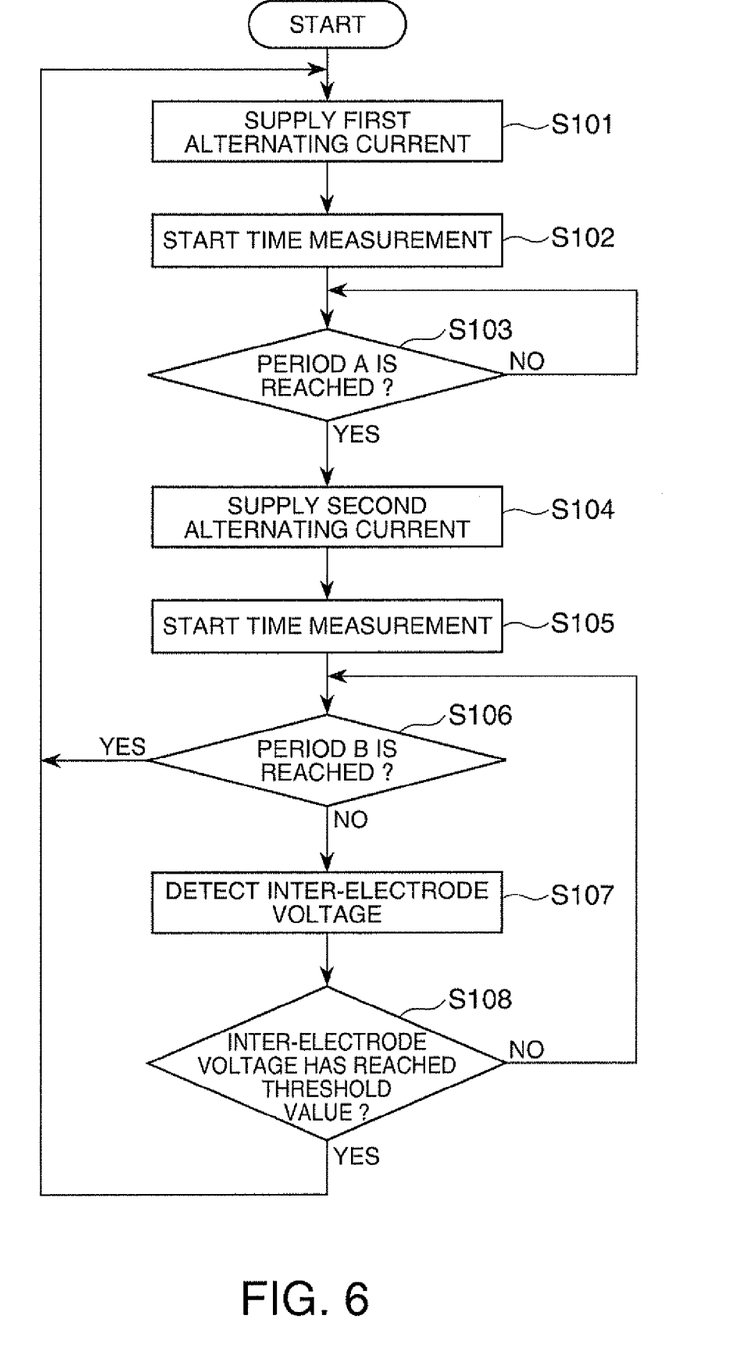
FIG. 6 is a flowchart showing a control function of the light source device shown in FIG. 1.

FIG. 1 is a cross-sectional view (including a block diagram) showing the light source device as an embodiment of the invention, FIG. 2 is a cross-sectional view showing the light source device shown in FIG. 1, FIG. 3 is a block diagram showing the light source device shown in FIG. 1, FIG. 4 is a diagram showing a drive current of the light source device shown in FIG. 1, FIG. 5 is a diagram showing an absolute value of the inter-electrode voltage of the light source device shown in FIG. 1, and FIG. 6 is a flowchart showing a control function of the light source device shown in FIG. 1. It should be noted that a secondary-reflecting mirror is omitted from the illustration in FIG. 2.

As shown in FIGS. 1 and 3, the light source device 1 is provided with a light source unit 110 having a discharge lamp 500, and a light source device main body 100. The light source device main body 100 is provided with a discharge lamp drive device (a drive device) 200 for driving the discharge lamp 500, a detector (a voltage detector) 35 for detecting the inter-electrode voltage between a pair of electrodes 610, 710 described later provided to the discharge lamp 500, and a time measurement device (a time measurement section) 36 for measuring time. Further, the light source device 1 is provided with a cooling device not shown for cooling a light emitting case 511 described later provided to the discharge lamp 500. The discharge lamp 500 is supplied with electric power by the discharge lamp drive device 200 to discharge to thereby emit light.

The light source unit 110 is provided with the discharge lamp 500, a primary reflecting mirror 112 having a concave reflecting surface, and a collimating lens 114 for making the outgoing light into roughly collimated light. The primary reflecting mirror 112 is disposed on one end of the discharge lamp 500, and the collimating lens 114 is disposed on the other end of the discharge lamp 500. The primary reflecting mirror 112 and the discharge lamp 500 are bonded to each other with an inorganic adhesive 116. Further, the primary reflecting mirror 112 has a reflecting surface on the discharge lamp 500 side (inside), and the reflecting surface forms an ellipsoid of revolution in the configuration shown in the drawing.

It should be noted that the shape of the reflecting surface of the primary reflecting mirror 112 is not limited to the shape described above, but a paraboloid of revolution, for example, can be cited besides the above. Further, in the case in which the primary reflecting mirror 112 has the reflecting surface formed of the paraboloid of revolution, by disposing the light emitting section of the discharge lamp 500 at a so-called focal point of the paraboloid of revolution, the collimating lens 114 can be eliminated.

The discharge lamp 500 is provided with a discharge lamp main body 510 and a secondary reflecting mirror 520 having a concave reflecting surface. The secondary reflecting mirror 520 is disposed on the opposite side to the primary reflecting mirror 112 of the discharge lamp main body 510, namely the collimating lens 114 side, and at a position having a predetermined distance from an outer peripheral surface of the discharge lamp main body 510. The discharge lamp main body 510 and the secondary reflecting mirror 520 are bonded to each other with an inorganic adhesive 522 disposed between the discharge lamp main body 510 and the secondary reflecting mirror 520. Further, the secondary reflecting mirror 520 has a reflecting surface on the discharge lamp 500 side (inside), and the reflecting surface forms a spherical surface in the configuration shown in the drawing.

In the central section of the discharge lamp main body 510, there is formed the light emitting case 511 including a discharge space (a hollow section) 512, in which a discharge medium described later is encapsulated, and which is sealed airtightly. The region of the discharge lamp main body 510 corresponding to at least the discharge space 512 has a light transmissive property. As the constituent material of the discharge lamp main body 510, there can be cited, for example, glass such as quartz glass, light transmissive ceramics.

The discharge lamp main body 510 is provided with the pair of electrodes 610, 710, a pair of connecting members 620, 720 having an electrical conductivity, and a pair of electrode terminals 630, 730. The electrode 610 and the electrode terminal 630 are electrically connected to each other via the connection member 620. Similarly, the electrode 710 and the electrode terminal 730 are electrically connected to each other via the connection member 720.

The electrodes 610, 710 are housed in the discharge space 512. In other words, the electrodes 610, 710 are disposed so that the respective tip portions have a predetermined distance from each other and opposed to each other in the discharge space 512 of the discharge lamp main body 510.

The inter-electrode distance as the shortest distance between the electrodes 610, 710 is preferably no smaller than 1 μm and no larger than 5 mm, and more preferably no smaller than 0.5 mm and no larger than 1.5 mm.

As shown in FIG. 2, the electrode 610 has a core rod 612, a coil portion 614, and a main body portion 616. The electrode 610 is formed in a stage prior to the encapsulation into the discharge lamp main body 510 by winding a wire made of an electrode material (e.g., tungsten) around the core rod 612 to form the coil portion 614, and then heating to melt the coil portion 614 thus formed. Thus, the main body portion 616 having a large thermal capacity is formed on the tip side of the electrode 610. Similarly to the electrode 610, the electrode 710 also has the core rod 712, a coil portion 714, and a main body portion 716, and is formed similarly to the electrode 610.

Although in the state in which the discharge lamp 500 has never been lit, the main body portions 616, 716 are not provided with projections 618, 718, if the discharge lamp 500 is lit once in the condition described later, the projections 618, 718 are formed on the tip portions of the main body portions 616, 716, respectively. The projections 618, 718 are maintained during the period of lighting the discharge lamp 500, and are further maintained after putting the discharge lamp 500 off.

It should be noted that as the constituent material of the electrodes 610, 710, a high-melting-point metal material such as tungsten can be cited for example.

Further, the discharge medium is encapsulated in the discharge space 512. The discharge medium includes, for example, a discharge starting gas, and a gas having a contribution to the light emission. Further, the discharge medium can also include another gas.

As the discharge starting gas, there can be cited, for example, a noble gas such as neon, argon, or xenon. Further, as the gas having a contribution to the light emission, there can be cited, for example, a vaporized substance of mercury or metal halide. Further, as another gas, there can be cited, for example, a gas having a function of preventing the blackening. As the gas having a function of preventing the blackening, there can be cited, for example, halogen (e.g., bromine), a halogen compound (e.g., hydrogen bromide), and vaporized substances of these materials.

Further, the air pressure in the discharge lamp main body 510 when lighting the discharge lamp is preferably no lower than 0.1 atm and no higher than 300 atm, and is further preferably no lower than 50 atm and no higher than 300 atm.

As described above, one of the electrode terminals of the discharge lamp 500, namely the electrode terminal 730, is electrically connected to the discharge lamp main body 510 on the opposite side to the primary reflecting mirror 112 via the electrode 710 and the connecting member 720, and is thus led out therefrom. Similarly, the other of the electrode terminals of the discharge lamp 500, namely the electrode terminal 630, is electrically connected to the discharge lamp main body 510 on the primary reflecting mirror 112 side via the electrode 610 and the connecting member 620, and is thus led out to the back side of the primary reflecting mirror 112. Further, the electrode terminals 630, 730 of the discharge lamp 500 are respectively connected to output terminals of the discharge lamp drive device 200, and the discharge lamp drive device 200 supplies the discharge lamp 500 with a drive current (drive power) including the high-frequency alternating current (alternating-current power). In other words, the discharge lamp drive device 200 supplies the electrodes 610, 710 with the drive current described above via the electrode terminals 630, 730 to thereby supply the discharge lamp 500 with power. When the drive current described above is supplied to the electrodes 610, 710, an arc discharge (an arc AR) occurs between the tip portions of the pair of electrodes 610, 710 inside the discharge space 512. The light (discharge light) generated by the arc discharge is emitted from the generation position (the discharge position) of the arc AR in all directions. The secondary reflecting mirror 520 is disposed to the discharge lamp main body 510 so as to cover the curved surface on the opposite side to the side where the primary reflecting mirror 112 is disposed as described above, and therefore reflects the light, which is emitted toward the one of the electrodes, namely the electrode 710, toward the primary reflecting mirror 112. By thus reflecting the light, which is emitted toward the electrode 710, toward the primary reflecting mirror 112, the light emitted toward the electrode 710 can effectively be used. It should be noted that although in the present embodiment the discharge lamp 500 is provided with the secondary reflecting mirror 520, a configuration in which the discharge lamp 500 is not provided with the secondary reflecting mirror 520 can also be adopted.

Then, the light source device main body 100 will be explained.

As shown in FIG. 3, the discharge lamp drive device 200 is a device provided with a direct current generator 31 for generating a direct current, a polarity switch 32 for switching the positive/negative polarity of the direct current output from the direct current generator 31, and a control section (a controller) 33, and for switching the polarity of the direct current using the polarity switch 32 to thereby generate an alternating current (an alternating direct current) with a predetermined frequency, and then supplying the pair of electrodes 610, 710 of the discharge lamp 500 with the alternating current as the drive current. It should be noted that the direct current generator 31, the polarity switch 32, and the control section 33 constitute a first alternating current supply section and a second alternating current supply section.

The control section 33 controls each of the overall operation of the discharge lamp drive device 200 such as the direct current generator 31 and the polarity switch 32, and the operation of the time measurement device 36. The direct current generator 31 can be adjusted in the current value as the output thereof, and the current value of the direct current generator 31 can be adjusted due to the control by the control section 33. Further, due to the control of the control section 33, the timing at which the polarity of the direct current is switched in the polarity switch 32 is adjusted.

Further, a detection result of a detector (inter-electrode distance detection section) 35, described later, separately disposed on the output side of the discharge lamp drive device 200 (between the electrode terminals 630, 730 of the discharge lamp 500 and the discharge lamp drive device 200) is input to the control section 33. It should be noted that although the detector 35 is disposed separately from the discharge lamp drive device 200 in the present embodiment, the configuration in which the detector 35 is incorporated in the discharge lamp drive device 200 can also be adopted. Further, although the time measurement device 36 is disposed separately from the discharge lamp drive device 200, the configuration in which the time measurement device 36 is incorporated in the discharge lamp drive device 200 can also be adopted. Further, an amplifier not shown can also be disposed in, for example, the posterior stage of the polarity switch 32, namely between the polarity switch 32 and the detector 35.

As shown in FIGS. 4 and 5, in the discharge lamp drive device 200, the polarity of the direct current generated by the direct current generator 31 is switched by the polarity switch 32 so that a first alternating current supply interval 41 for generating a first alternating current (a high-frequency alternating current) and then supplying it to the pair of electrodes 610, 710 and a second alternating current supply interval 42 for generating a second alternating current (a low-frequency alternating current) having the frequency lower than that of the first alternating current and then supplying it to the pair of electrodes 610, 710 are repeated alternately. In other words, the alternating current as the drive current for driving the discharge lamp having the first alternating current supply interval 41 and the second alternating current supplying interval 42 repeated alternately is generated, and is then output. The drive current output from the discharge lamp drive device 200 is supplied to the pair of electrodes 610, 710 of the discharge lamp 500.

Thus, as described above, the arc discharge occurs between the tip portions of the pair of electrodes 610, 710, and the discharge lamp 500 is lit. Further, while the discharge lamp 500 is in the lighting state, the cooling device described above operates to cool the light emitting case 511.

Here, in the light source device 1, since the discharge lamp 500 is lit using the drive current having the condition described later, while the discharge lamp 500 is in the lighting state, the temperature of the electrodes 610, 710 varies, and due to the variation, the projections 618, 718 are respectively provided to the tip portions of the electrodes 610, 710, and thus, the projections 618, 718 can be maintained. Further, the blackening of the discharge lamp 500 can be prevented to thereby achieve a longer operating life.

That is, since the second alternating current described later is supplied to the electrodes 610, 710 in the second alternating current supply interval 42, the projections 618, 718 are provided to the tip portions of the electrodes 610, 710, and then the projections 618, 718 grow to thereby make it possible to narrow (reduce) the inter-electrode distance of the pair of electrodes 610, 710, which has been increased in the first alternating current supply interval 41 described later.

Specifically, in the second alternating current supply interval 42, firstly the temperature of each of the electrodes 610, 710 rises in an interval 44 in which the polarity of the second alternating current is positive, and thus, the tip portions of the electrodes 610, 710 are partially melted, and then the electrode material thus melted is collected in the tip portions of the electrodes 610, 710 due to the surface tension. In contrast, in the interval in which the polarity of the second alternating current is negative, since the temperature of each of the electrodes 610, 710 drops, the electrode material thus melted is solidified. By repeating the state in which the electrode material thus melted is collected in tip portions of the electrodes 610, 710 and the state in which the electrode material thus melted is solidified described above, the growth of the projections 618, 718 occurs.

Further, as described later, by switching the first alternating current supply interval 41 and the second alternating current supply interval 42 to thereby limit the inter-electrode distance within a predetermined range, it is possible to inhibit the inter-electrode distance from increasing to thereby maintain the state with the short inter-electrode distance. Thus, it is possible to efficiently drive the discharge lamp 500.

It should be noted that the blackening of the discharge lamp 500 occurs in the second alternating current supply interval 42.

In contrast, in the first alternating current supply interval 41, since the first alternating current described later is supplied to the electrodes 610, 710, it is possible to suppress the blackening of the discharge lamp 500, and further make the discharge lamp 500, which has been blackened in the second alternating current supply interval 42, recover from the blackening.

It should be noted that in the first alternating current supply interval 41, the projections 618, 718 provided to the tip portions of the electrodes 610, 710 shrink in the second alternating current supply interval 42 to thereby continue to increase the inter-electrode distance.

By alternately repeating such first alternating current supply interval 41 and second alternating current supply interval 42, it is possible to drive the discharge lamp 500 while suppressing the blackening of the discharge lamp 500, and keeping the inter-electrode distance in the allowable distance range.

Here, the rated wattage of the discharge lamp 500 is appropriately set in accordance with the usage or the like, and is not particularly limited, but is preferably in a range of no lower than 10 W and no higher than 5 kW, and is more preferably in a range of no lower than 100 W and no higher than 500 W.

Further, the frequency of the first alternating current is higher than 1 kHz. Further, the frequency of the first alternating current is preferably in a range of higher than 1 kHz and no higher than 10 GHz, more preferably in a range of higher than 1 kHz and no higher than 100 kHz or a range of no lower than 3 MHz and no higher than 10 GHz, further more preferably in a range of no lower than 3 kHz and no higher than 100 kHz or a range of no lower than 3 MHz and no higher than 3 GHz, and particularly preferably in a range of no lower than 3 kHz and no higher than 100 kHz or a range of no lower than 3 MHz and no higher than 3 GHz. Further, more specifically, the frequency of the first alternating current is preferably in a range of no lower than 3 kHz and no higher than 100 kHz, and is more preferably in a range of no lower than 5 kHz and no higher than 100 kHz.

When each of the electrodes 610, 710 acts as an anode, the electrode temperature rises to a level higher than in the case in which it acts as a cathode. However, by setting the frequency of the first alternating current to a level higher than 1 kHz, it is possible to prevent the variation in the electrode temperature in one cycle of the first alternating current, and thus it is possible to suppress the blackening of the discharge lamp 500, and further make the discharge lamp 500, which has been blackened in the second alternating current supply interval 42, recover from the blackening.

However, if the frequency of the first alternating current is equal to or lower than 1 kHz, the temperature of the electrodes 610, 710 varies every one cycle of the first alternating current, and the discharge lamp 500 is blackened.

Further, those having the frequency of the first alternating current higher than 10 GHz is high in cost.

Further, if the frequency of the first alternating current is higher than 100 kHz and lower than 3 MHz, the discharge becomes unstable due to the acoustic resonance effect depending on other conditions.

The frequency of the second alternating current is equal to or lower than 1 kHz. Further, the frequency of the second alternating current is preferably equal to or lower than 500 Hz, more preferably in a range of no lower than 10 Hz and no higher than 500 Hz, and further more preferably in a range of no lower than 30 Hz and no higher than 300 Hz.

If the frequency of the second alternating current exceeds 1 kHz, the projections 618, 718 are not formed. Further, if the frequency of the second alternating current is lower than 10 Hz, depending on other conditions the projections 618, 718 are crushed by fusion, and the blackening becomes easier to occur.

Further, in the first alternating current supply interval 41, the amplitude of the first alternating current is gradually decreased with time. Therefore, in the first alternating current supply interval 41, since the projections 618, 718 shrink to increase the inter-electrode distance, and the inter-electrode voltage (an absolute value of the inter-electrode voltage) gradually increases with time, the amplitude of the first alternating current is gradually decreased with time so that the power supplied to the discharge lamp 500 becomes constant. Thus, the light intensity can be made constant.

In contrast, in the second alternating current supply interval 42, the amplitude of the second alternating current is gradually increased with time. Therefore, in the second alternating current supply interval 42, since the projections 618, 718 grow to decrease the inter-electrode distance, and the inter-electrode voltage (the absolute value of the inter-electrode voltage) gradually decreases with time, the amplitude of the second alternating current is gradually increased with time so that the power supplied to the discharge lamp 500 becomes constant. Thus, the light intensity can be made constant.

Further, the waveforms of the first alternating current and the second alternating current each form a rectangular shape (a rectangular wave). Thus, the blackening of the discharge lamp 500 can more surely be suppressed.

It should be noted that the waveforms of the first alternating current and the second alternating current are each not limited to a rectangular shape, but can also be, for example, a wavelike shape.

Further, assuming that the period of the first alternating current is a1, and the period of an interval 43 is b1, the ratio b1/a1 (the duty ratio) between the period a1 and the period b1 is preferably in a range of no lower than 10% and no higher than 90%, more preferably in a range of no lower than 20% and no higher than 80%, and further more preferably 50%.

Further, assuming that the period of the second alternating current is a2, and the period of an interval 44 is b2, the ratio b2/a2 (the duty ratio) between the period a2 and the period b2 is preferably in a range of no lower than 10% and no higher than 90%, more preferably in a range of no lower than 20% and no higher than 80%, and further more preferably 50%. Thus, it is possible to form the projections 618, 718 on the electrodes 610, 710 symmetrically to each other.

Further, in the case of equalizing the light intensity in the first alternating current supply interval 41 and the light intensity in the second alternating current supply interval 42 with each other, the average value of the amount of the first alternating current in the first alternating current supply interval 41 and the average value of the amount of the second alternating current in the second alternating current supply interval 42 are set to the same value.

Further, as the detector 35 of the light source device 1, a voltmeter is used in the present embodiment. Further, the inter-electrode voltage of the pair of electrodes 610, 710 of the discharge lamp 500 is detected by the detector 35, and the inter-electrode voltage thus detected is used for the drive control of the discharge lamp 500 as described later. The inter-electrode voltage is a value corresponding to the inter-electrode distance. Therefore, by obtaining the inter-electrode voltage described above, it results that the inter-electrode distance is indirectly obtained. It should be noted that the higher the inter-electrode voltage is, the longer the inter-electrode distance is. Further, since the inter-electrode voltage is measured by the voltmeter in the present embodiment, the present embodiment is preferably applied to the case in which the frequency of the drive current, namely the frequency of the first alternating current, is lower than 1 MHz.

In the light source device 1, the period of the first alternating current supply interval 41 of the drive current is set to the period A and the period of the second alternating current supply interval 42 thereof is set to the period B in the discharge limp drive device 200. Further, a threshold value of the absolute value for the inter-electrode voltage of the pair of electrodes 610, 710 is set. It should be noted that the periods A, B, and the threshold values will be described later.

Further, while the discharge lamp 500 is in the lighting state, the inter-electrode voltage of the pair of electrodes 610, 710 is detected by the detector 35, and the inter-electrode voltage thus detected is transmitted to the control section 33. Further, while the discharge lamp 500 is in the lighting state, the control section 33 measures each of the period of the first alternating current supply interval 41 and the period of the second alternating current supply interval 42 using the time measurement device 36.

Further, as shown in FIG. 5, the control section 33 switches between the first alternating current supply interval 41 and the second alternating current supply interval 42 in accordance with the inter-electrode voltage thus detected, and the period of the first alternating current supply interval 41 and the period of the second alternating current supply interval 42 thus measured.

Specifically, in the first alternating current supply interval 41, the control section 33 measures the period of the first alternating current supply interval 41 using the time measurement device 36, and then performs the change from the first alternating current supply interval 41 to the second alternating current supply interval 42 when the period of the first alternating current supply interval 41 reaches the period A. Further, in the second alternating current supply interval 42, the control section 33 measures the period of the second alternating current supply interval 42 using the time measurement device 36, and at the same time, detects the inter-electrode voltage using the detector 35, and then performs the change from the second alternating current supply interval 42 to the first alternating current supply interval 41 when the period of the second alternating current supply interval 42 reaches the period B, or the absolute value of the inter-electrode voltage reaches the threshold value. Thus, the inter-electrode distance can be limited within a predetermined range.

Here, in the initial stage of lighting of the discharge lamp 500, it is difficult for the discharge lamp 500 to recover from the blackening, and the projections 618, 718 are easy to decrease in the first alternating current supply interval 41. Further, in the second alternating current supply interval 42, the discharge lamp 500 is easy to be blackened, and the projections 618, 718 are easy to grow.

Then, as time goes on, the discharge lamp 500 becomes easy to recover from the blackening, and the projections 618, 718 become difficult to decrease in the first alternating current supply interval 41. Further, in the second alternating current supply interval 42, the discharge lamp 500 becomes difficult to be blackened, and the projections 618, 718 become difficult to grow.

As described above, if the period of the first alternating current supply interval 41 is set to the period A, the period of the second alternating current supply interval 42 is set to the period B, and then the discharge lamp 500 is lit, the projections 618, 718 shrink to increase the inter-electrode distance, and the absolute value of the inter-electrode voltage continues to increase in the first alternating current supply interval 41. In contrast, in the second alternating current supply interval 42, the projections 618, 718 grow to decrease the inter-electrode distance, and the absolute value of the inter-electrode voltage continues to decrease.

Then, as time goes on, since the projections 618, 718 become difficult to grow in the second alternating current supply interval 42, the inter-electrode distance at which the switching from the second alternating current supply interval 42 to the first alternating current supply interval 41 is performed, namely the absolute value $\alpha 2$ of the inter-electrode voltage at which the switching from the second alternating current supply interval 42 to the first alternating current supply interval 41, is performed continues to increase. Further, although the inter-electrode distance at which the switching from the first alternating current supply interval 41 to the second alternating current supply interval 42 is performed, namely the absolute value α1 of the inter-electrode voltage at which the switching from the first alternating current supply interval 41 to the second alternating current supply interval 42 is performed, also continues to increase as time goes on, the increment thereof is smaller than the increment of the absolute value α2 of the inter-electrode voltage. In other words, the increment per unit time of the absolute value α1 of the inter-electrode voltage is smaller than the increment per unit time of the absolute value α2 of the inter-electrode voltage, and therefore, the difference between the absolute value α1 of the inter-electrode voltage and the absolute value α2 of the inter-electrode voltage decreases with time.

Thus, since not only the absolute value α2 of the inter-electrode voltage but also the absolute value α1 of the inter-electrode voltage increases, it can be prevented that the absolute value α1 of the inter-electrode voltage and the absolute value α2 of the inter-electrode voltage coincide with each other or approximate too close to each other to thereby make it unachievable to drive the discharge lamp 500, and the lifetime of the light source device 1 can be elongated.

Further, since the increment per unit time of the absolute value α1 of the inter-electrode voltage is smaller than the increment per unit time of the absolute value α2 of the inter-electrode voltage, it can be prevented that the inter-electrode voltage rises to a too high level at an early stage to thereby degrade the illuminance, and the lifetime of the light source device 1 can be elongated.

Further, by setting the period A to be relatively long, namely setting the period A in such a manner as described later, it is possible to make the discharge lamp 500 recover from the blackening in the first alternating current supply interval 41 at an initial stage of lighting the discharge lamp 500 at which the discharge lamp 500 is difficult to recover from the blackening. Further, the difference between the absolute value α1 of the inter-electrode voltage and the absolute value α2 of the inter-electrode voltage increases, namely the absolute value α1 of the inter-electrode voltage increases, at an initial stage of lighting of the discharge lamp 500, the average value of the drive current can be decreased, and it is possible to make the discharge lamp 500 easy to recover from the blackening.

Further, since the projections 618, 718 are easy to grow in the second alternating current supply interval 42 at an initial stage of lighting of the discharge lamp 500, it is possible to sufficiently grow the projections 618, 718, which have shrunk in the first alternating current supply interval 41, in the second alternating current supply interval 42.

Further, the period A and the period B are each not particularly limited, but are set in accordance with a variety of conditions. However, the period A is preferably in a range of no shorter than 1 minute and no longer than 60 minutes, and more preferably in a range of no shorter than 5 minutes and no longer than 30 minutes. Thus, it is possible to more surely make the discharge lamp 500 recover from the blackening in the first alternating current supply interval 41.

Further, the period B is preferably in a range of no shorter than 1 minute and no longer than 60 minutes, and more preferably in a range of no shorter than 5 minutes and no longer than 30 minutes. Thus, the inter-electrode distance can more surely be kept within an allowable distance range.

Further, the ratio A/B between the period A and the period B is preferably in a range of no lower than 0.5 and no higher than 10, and more preferably in a range of no lower than 1 and no higher than 5. Thus, it is possible to achieve both of suppression of the blackening of the discharge lamp 500 and limitation of the inter-electrode distance within the allowable distance range.

Further, although the period A and the period B can be equal to each other or different from each other, it is preferable that the period A is set to be longer than the period B. In other words, the ratio A/B is preferably set to be greater than 1, and more preferably set to be equal to or greater than 2. Thus, it is possible to more surely make the discharge lamp 500 recover from the blackening in the first alternating current supply interval 41.

Therefore, the ratio A/B is preferably set to be in a range of greater than 1 and no greater than 10, and more preferably set to be in a range of no lower than 2 and no greater than 10. Thus, it is possible to achieve both of suppression of the blackening of the discharge lamp 500 and limitation of the inter-electrode distance within the allowable distance range, and in particular to more surely suppress the blackening of the discharge lamp 500.

Further, the threshold value for the absolute value of the inter-electrode voltage is the lower limit value of the allowable range of the absolute value of the inter-electrode voltage, and is set to the absolute value of the inter-electrode voltage at which the power supplied to the pair of electrodes 610, 710 reaches the rated wattage after lighting the discharge lamp 500 in the present embodiment. It should be noted that it is obvious that the threshold value described above can be set to a value other than the values described above.

Then, a control action of the discharge lamp drive device 200 of the light source device 1 will be explained with reference to FIG. 6.

Firstly, the first alternating current supply interval 41 is set to thereby supply the pair of electrodes 610, 710 with the first alternating current, and thus, the discharge lamp 500 is lit (step S101). Therefore, the projections 618, 718 continue to shrink, and the inter-electrode voltage increases gradually. It should be noted that the first alternating current is decreased gradually so that the power supplied thereto is constant.

Subsequently, measurement of the period of the first alternating current supply interval 41 is started (step S102), and then whether or not the period of the first alternating current supply interval 41 thus measured has reached the period A, which is a predetermined value appropriately set in advance, is determined (step S103).

In the step S103, if the period of the first alternating current supply interval 41 has not reached the period A, the process returns to the step S102, and then the step S102 and the following steps are performed again. In other words, the first alternating current continues to be supplied to the pair of electrodes until the period of the first alternating current supply interval 41 thus measured reaches the period A, which is the predetermined value appropriately set in advance.

Further, if the period of the first alternating current supply interval 41 has reached the period A in the step S103, the second alternating current supply interval 42 is set, and the second alternating current is supplied to the pair of electrodes 610, 710 (step S104). Therefore, the projections 618, 718 continue to grow, and the inter-electrode voltage decreases gradually. It should be noted that the second alternating current is increased gradually so that the power supplied thereto is constant.

Subsequently, measurement of the period of the second alternating current supply interval 42 is started (step S105), and then whether or not the period of the second alternating current supply interval 42 thus measured has reached the period B, which is a predetermined value appropriately set in advance, is determined (step S106).

In the step S106, if the period of the second alternating current supply interval 42 has not reached the period B, the inter-electrode voltage is detected (step S107), and then whether the absolute value of the inter-electrode voltage thus detected is a value lower than the threshold value or a value having reached the threshold value is determined (step S108).

In the step S108, if the absolute value of the inter-electrode voltage is the value lower than the threshold value, the process returns to the step S106, and then the step S106 and the following steps are performed again.

Further, in the step S106, if the period of the second alternating current supply interval 42 has reached the period B, the process returns to the step S101, and then the step S101 and the following steps are performed again.

Further, in the step S108, if the absolute value of the inter-electrode voltage has reached the threshold value, the process returns to the step S101, and then the step S101 and the following steps are performed again. Thus, the absolute value of the inter-electrode voltage is kept within the allowable range, and the inter-electrode distance is kept within the allowable range.

As explained hereinabove, according to the light source device 1, it is possible to suppress the blackening of the discharge lamp 500 to thereby achieve a longer operating life. Further, the projections 618, 718 are provided to the electrodes 610, 710, and the inter-electrode distance can be kept within the allowable distance range, and thus it is possible to efficiently drive the discharge lamp 500.

Although the light source device and the method of driving the discharge lamp according to the invention are hereinabove explained based on the embodiment shown in the accompanying drawings, the invention is not limited thereto, but the configuration of each of the components can be replaced with one having an equivalent function and an arbitrary configuration. Further, it is possible to add any other constituents to the invention.

Projector

Figure 7:
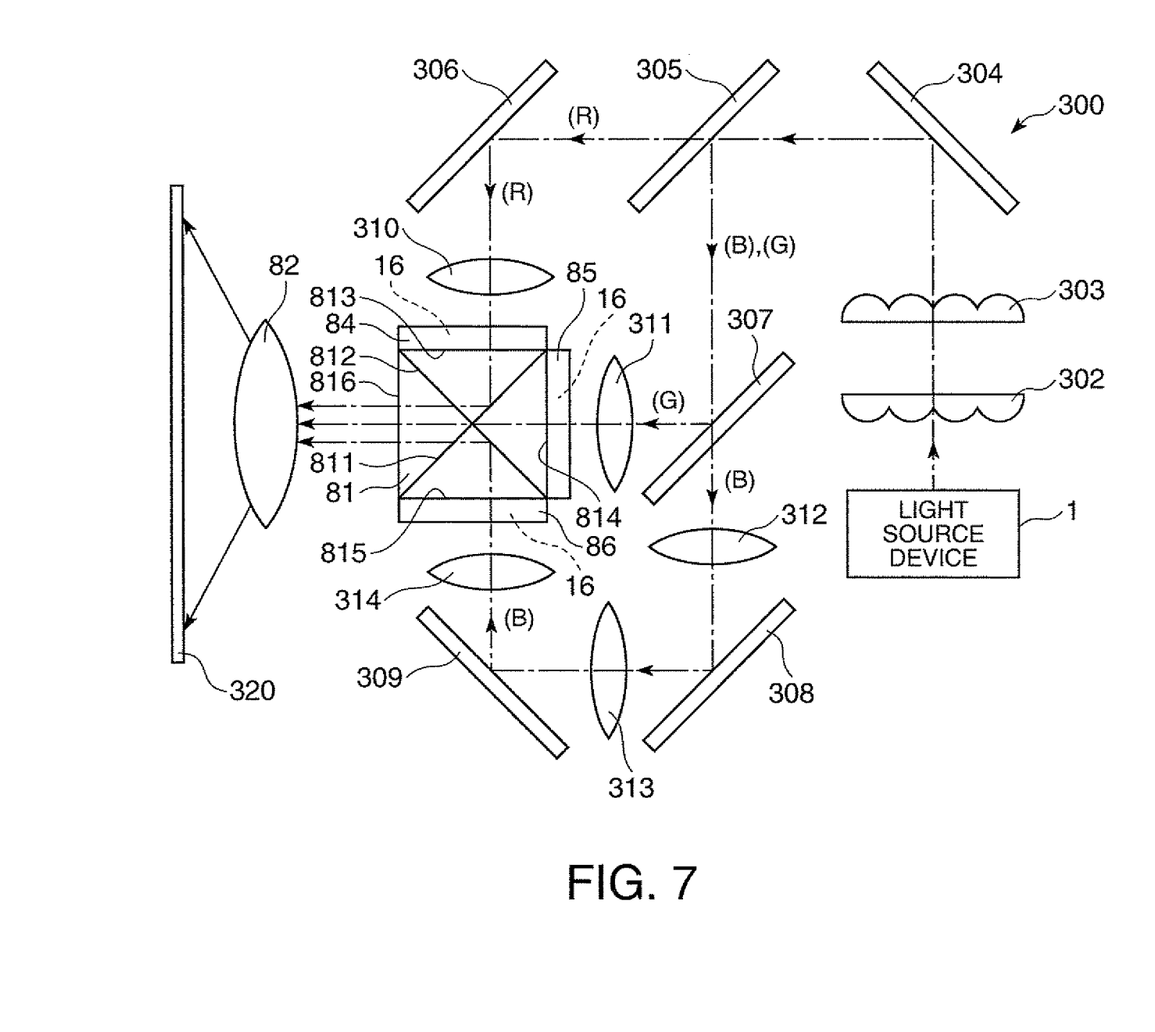
FIG. 7 is a diagram schematically showing a projector as an embodiment of the invention.

FIG. 7 is a diagram schematically showing a projector as an embodiment of the invention.

The projector 300 shown in FIG. 7 is provided with the light source device 1 described above, an illumination optical system having integrator lenses 302, 303, a color separation optical system (a light guide optical system), a liquid crystal light valve 84 (for a red color) corresponding to a red color, a liquid crystal light valve 85 (for a green color) corresponding to a green color, a liquid crystal light valve 86 (for a blue color) corresponding to a blue color, a dichroic prism (a color combining optical system) 81 provided with a dichroic mirror surface 811 for reflecting only the red light and a dichroic mirror surface 812 for reflecting only the blue light, and a projection lens (a projection optical system) 82.

The color separation optical system has mirrors 304, 306, and 309, a dichroic mirror 305 for reflecting the blue light and the green light (transmitting only the red light), a dichroic mirror 307 for reflecting only the green light, a dichroic mirror 308 for reflecting only the blue light, and collecting lenses 310, 311, 312, 313, and 314.

The liquid crystal light valve 85 has a liquid crystal panel 16, a first polarization plate (not shown) disposed on the entrance side of the liquid crystal panel 16, and a second polarization plate (not shown) disposed on the exit side of the liquid crystal panel 16. The liquid crystal light valves 84, 86 each have substantially the same configuration as that of the liquid crystal light valve 85. The liquid crystal panels 16 of these liquid crystal light valves 84, 85, and 86 are each connected to a drive circuit not shown.

It should be noted that in the projector 300 a substantial part of a modulation device for modulating the light emitted from the light source device 1 based on the image information is composed of the liquid crystal light valves 84, 85, and 86, and the drive circuit, and a substantial part of a projection device for projecting the light modulated by the modulation device is formed of the projection lens 82.

Then, the action of the projector 300 will be explained.

Firstly, white light (a white light beam) emitted from the light source device 1 is transmitted through the integrator lenses 302, 303. The light intensity (the luminance distribution) of the white light is homogenized by the integrator lenses 302, 303.

The white light transmitted through the integrator lenses 302, 303 is reflected by the mirror 304 leftward in FIG. 7, and then the blue light (B) and the green light (G) out of the reflected light are each reflected by the dichroic mirror 305 downward in FIG. 7, while the red light (R) is transmitted through the dichroic mirror 305.

The red light transmitted through the dichroic mirror 305 is reflected by the mirror 306 downward in FIG. 7, and the reflected light is faired by the collecting lens 310, and then enters the liquid crystal light valve 84 for the red color.

The green light among the blue light and the green light reflected by the dichroic mirror 305 is reflected by the dichroic mirror 307 leftward in FIG. 7, and the blue light is transmitted through the dichroic mirror 307.

The green light reflected by the dichroic mirror 307 is faired by the collecting lens 311, and then enters the liquid crystal light valve 85 for the green color.

Further, the blue light transmitted through the dichroic mirror 307 is reflected by the dichroic mirror 308 leftward in FIG. 7, and then the reflected light is reflected by the mirror 309 upward in FIG. 7. The blue light described above is faired by the collecting lenses 312, 313, and 314, and then enters the liquid crystal light valve 86 for the blue color.

As described above, the white light emitted from the light source device 1 is separated in color by the color separation optical system into the three primary colors of red, green, and blue, and respectively guided to and then enter the corresponding liquid crystal light valves 84, 85, and 86.

On this occasion, the drive circuit acting in accordance with the image signal for the red color performs switching (ON/OFF) control on each of the pixels of the liquid crystal panel 16 of the liquid crystal light valve 84, the drive circuit acting in accordance with the image signal for the green color performs switching control on each of the pixels of the liquid crystal panel 16 of the liquid crystal light valve 85, and the drive circuit acting in accordance with the image signal for the blue color performs switching control on each of the pixels of the liquid crystal panel 16 of the liquid crystal light valve 86.

Thus, the red light, the green light, and the blue light are respectively modulated by the liquid crystal light valves 84, 85, and 86 color by color, and the image for the red color, the image for the green color, and the image for the blue color are formed respectively.

The image for the red color formed by the liquid crystal light valve 84, namely the red light from the liquid crystal light valve 84, enters the dichroic prism 81 through an entrance surface 813, and is then reflected leftward in FIG. 7 by the dichroic mirror surface 811, transmitted through the dichroic mirror surface 812, and then emitted from an exit surface 816.

Further, the image for the green color formed by the liquid crystal light valve 85, namely the green light from the liquid crystal light valve 85, enters the dichroic prism 81 through an entrance surface 814, and is then transmitted through the dichroic mirror surfaces 811, 812, and then emitted from the exit surface 816.

Further, the image for the blue color formed by the liquid crystal light valve 86, namely the blue light from the liquid crystal light valve 86, enters the dichroic prism 81 through an entrance surface 815, and is then reflected leftward in FIG. 7 by the dichroic mirror surface 812, transmitted through the dichroic mirror surface 811, and then emitted from the exit surface 816.

As described above, the lights of the respective colors from the liquid crystal light valves 84, 85, and 86, namely the images formed respectively by the liquid crystal light valves 84, 85, and 86, are combined by the dichroic prism 81, and thus, the color image is formed. The image is projected (projected in an enlarged manner) by the projection lens 82 on a screen 320 installed at a predetermined position.

As explained hereinabove, according to the projector 300, since the light source device 1 described above is provided, the power consumption can be reduced, and further, a stable and preferable image can be displayed.

SPECIFIC EXAMPLE

A specific example according to the invention will hereinafter be described.

First Specific Example

The light source device shown in FIG. 1 and provided with the configuration described below is manufactured.

Further, when lighting the discharge lamp, there is performed the control of performing the change from the first alternating current supply interval to the second alternating current supply interval when the period of the first alternating current supply interval reaches the period A, and performing the change from the second alternating current supply interval to the first alternating current supply interval when the period of the second alternating current supply interval reaches the period B or when the absolute value of the inter-electrode voltage of the pair of electrodes reaches the threshold value.

constituent material of the discharge lamp main body: quartz glass
    encapsulated substances in the discharge lamp main body: argon, mercury, methyl bromide
    air pressure in the discharge lamp main body when lighting: 200 atm
    constituent material of the electrodes: tungsten
    inter-electrode distance: 1.1 mm
    rated wattage: 200 W
    frequency of the first alternating current (high-frequency current): 5 kHz
    duty ratio (b1/a1) of the first alternating current: 50%
    waveform of the first alternating current: rectangular shape
    frequency of the second alternating current (low-frequency current): 135 Hz
    duty ratio (b2/a2) of the second alternating current: 50%
    waveform of the second alternating current: rectangular shape
    drive current: The current is controlled so that the power is 200 W.
    period A: 10 minutes
    period B: 10 minutes
    threshold value: 68 V First Comparative Example The light source device substantially the same as the first specific example except the change in control described below is manufactured.

When lighting the discharge lamp, there is performed the control of performing the change from the first alternating current supply interval to the second alternating current supply interval when the absolute value of the inter-electrode voltage of the pair of electrodes reaches the upper limit value of the allowable range, and performing the change from the second alternating current supply interval to the first alternating current supply interval when the absolute value of the inter-electrode voltage of the pair of electrodes reaches the lower limit value of the allowable range. It should be noted that in the second alternating current supply interval, if the period thereof becomes equal to the period of the first alternating current supply interval, the change from the second alternating current supply interval to the first alternating current supply interval is performed even in the case in which the absolute value of the inter-electrode voltage of the pair of electrodes does not reach the lower limit value of the allowable range.

lower limit value of the absolute value of the inter-electrode voltage: 68 V
    upper limit value of the absolute value of the inter-electrode voltage: 73 V

EVALUATION

Each of the light source devices of the first specific example and the first comparative example is used as the light source device of the projector, and the continuous lighting by the projector is performed, and then the variation in illuminance on the screen is checked.

As a result, in the first specific example, since the blackening does not occur in the initial stage, the devitrification does not occur, and further, since the electrodes are consumed gently, the illuminance at a time point 10,000 hours after the beginning of the lighting is 50% of the initial illuminance.

In contrast, in the first comparative example, although the illuminance transitions with a level equivalent to the first specific example without generating the blackening until 1,000 hours elapse after the beginning of the lighting, thereafter the discharge lamp fails to be driven within the lamp control range due to the consumption of the electrode, and then the illuminance degradation is accelerated, and the illuminance reaches a level 50% of the initial illuminance at a time point 6,000 hours from the beginning of the lighting.

The entire disclosure of Japanese Patent Application No. 2012-027825, filed Feb. 10, 2012 is expressly incorporated by reference herein.

What is claimed is:
1. A light source device comprising:
    a discharge lamp having a light emitting case including a hollow section in which a discharge medium is encapsulated, and a pair of electrodes having respective end portions disposed so as to be opposed to each other in the hollow section;
    a drive device adapted to supply the pair of electrodes with a drive current;
    a voltage detector adapted to detect an inter-electrode voltage of the pair of electrodes; and
    a time measurement device adapted to measure time,
    wherein the drive device is configured to alternately repeat
        a first alternating current supply interval in which the pair of electrodes are supplied with a first alternating current with a frequency higher than 1 kHz and
        a second alternating current supply interval in which the pair of electrodes are supplied with a second alternating current with a frequency one of equal to and lower than 1 kHz, a period of the first alternating current supply interval is measured with the time measurement device, the drive device performs a change from the first alternating current supply interval to the second alternating current supply interval when the period of the first alternating current supply interval measured reaches a predetermined period A, a period of the second alternating current supply interval is measured with the time measurement device, and the drive device performs a change from the second alternating current supply interval to the first alternating current supply interval one of when the period of the second alternating current supply interval measured reaches a predetermined period B, and when an absolute value of the inter-electrode voltage of the pair of electrodes reaches a threshold value.

2. The light source device according to claim 1, wherein the threshold value is an absolute value of the inter-electrode voltage of the pair of electrodes when a power supplied to the pair of electrodes reaches a rated wattage after lighting the discharge lamp.

3. The light source device according to claim 1, wherein a ratio A/B between the period A and the period B is no lower than 0.5 and no higher than 10.

4. The light source device according to claim 1, wherein the period A is longer than the period B.

5. The light source device according to claim 1, wherein the period A is no shorter than 1 minute and no longer than 60 minutes.

6. The light source device according to claim 1, wherein the period B is no shorter than 1 minute and no longer than 60 minutes.

7. The light source device according to claim 1, wherein in the first alternating current supply interval, an amplitude of the first alternating current is decreased with time.

8. The light source device according to claim 1, wherein in the second alternating current supply interval, an amplitude of the second alternating current is increased with time.

9. The light source device according to claim 1, wherein a waveform of the first alternating current has a rectangular shape.

10. The light source device according to claim 1, wherein a waveform of the second alternating current has a rectangular shape.

11. The light source device according to claim 1, wherein the first alternating current is supplied to thereby suppress blackening of the discharge lamp.

12. The light source device according to claim 1, wherein the second alternating current is supplied to thereby decrease an inter-electrode distance of the pair of electrodes.

13. The light source device according to claim 1, wherein an average value of an amplitude of the first alternating current in the first alternating current supply interval and an average value of an amplitude of the second alternating current in the second alternating current supply interval are equal to each other.

14. A method of driving a discharge lamp having a light emitting case including a hollow section in which a discharge medium is encapsulated, and a pair of electrodes having respective end portions disposed so as to be opposed to each other in the hollow section, the method comprising:

generating a drive current having a first alternating current supply interval in which the pair of electrodes are supplied with a first alternating current with a frequency higher than 1 kHz and a second alternating current supply interval in which the pair of electrodes are supplied with a second alternating current with a frequency one of equal to and lower than 1 kHz repeated alternately, changed from the first alternating current supply interval to the second alternating current supply interval when a period of the first alternating current supply interval reaches a predetermined period A, and changed from the second alternating current supply interval to the first alternating current supply interval one of when a period of the second alternating current supply interval reaches a predetermined period B, and when an absolute value of an inter-electrode voltage of the pair of electrodes reaches a threshold value; and supplying the pair of electrodes with the drive current.

15. A projector comprising:

a light source device adapted to emit light;

a modulation device adapted to modulate the light emitted from the light source device in accordance with image information; and a projection device adapted to project the light modulated by the modulation device, wherein the light source device includes a discharge lamp having a light emitting case including a hollow section in which a discharge medium is encapsulated, and a pair of electrodes having respective end portions disposed so as to be opposed to each other in the hollow section, a drive device adapted to supply the pair of electrodes with a drive current, a voltage detector adapted to detect an inter-electrode voltage of the pair of electrodes, and a time measurement device adapted to measure time, the drive device is configured to alternately repeat a first alternating current supply interval in which the pair of electrodes are supplied with a first alternating current with a frequency higher than 1 kHz and a second alternating current supply interval in which the pair of electrodes are supplied with a second alternating current with a frequency one of equal to and lower than 1 kHz, a period of the first alternating current supply interval is measured with the time measurement device, the drive device performs a change from the first alternating current supply interval to the second alternating current supply interval when the period of the first alternating current supply interval reaches a predetermined period A, a period of the second alternating current supply interval is measured with the time measurement device, and the drive device performs a change from the second alternating current supply interval to the first alternating current supply interval one of when the period of the second alternating current supply interval reaches a predetermined period B, and when an absolute value of the inter-electrode voltage of the pair of electrodes reaches a threshold value.

* * * * *